United States Patent [19]

Madabhushi

[11] Patent Number: 5,502,780
[45] Date of Patent: Mar. 26, 1996

[54] WAVEGUIDE TYPE OPTICAL DEVICE

[75] Inventor: Rangaraj Madabhushi, Tokyo, Japan

[73] Assignee: NEC Corporation, Japan

[21] Appl. No.: 401,307

[22] Filed: Mar. 9, 1995

Related U.S. Application Data

[63] Continuation of Ser. No. 225,065, Apr. 8, 1994, abandoned.

[30] Foreign Application Priority Data

Apr. 13, 1993 [JP] Japan .................................. 5-085819

[51] Int. Cl.⁶ ..................................................... G02F 1/035
[52] U.S. Cl. ........................... 385/3; 385/2; 385/8; 385/9; 385/40
[58] Field of Search ..................... 385/3, 1, 2, 4, 385/8, 9, 11, 14, 15, 16, 23, 31, 40, 45

[56] References Cited

U.S. PATENT DOCUMENTS

| | | | |
|---|---|---|---|
| 4,850,667 | 7/1989 | Djupsjöbacka | 385/2 |
| 5,185,830 | 2/1993 | Nishimoto | 385/11 |
| 5,214,724 | 5/1993 | Seino et al. | 385/8 X |
| 5,416,859 | 5/1995 | Burns et al. | 385/3 |

OTHER PUBLICATIONS

M. Rangaraj, et al.; "A Wide–Band Ti:LiNbO3 Optical Modulator With a Conventional Coplanar Waveguide Type Electrode"; IEEE Photonics Technology Letters, vol. 4, No. 9, Sep. 1992, pp. 1020–1022.

"New Travelling–Wave Electrode Mach–Zehnder Optical Modulator With . . . Wavelength"; Electronics Letters, vol. 25, No. 20, Sep. 28, 1989, pp. 1382–1383.

*Primary Examiner*—John D. Lee
*Assistant Examiner*—Phan T. H. Palmer
*Attorney, Agent, or Firm*—Whitham, Curtis, Whitham & McGinn

[57] ABSTRACT

A waveguide type optical device is provided. Waveguides of titanium metal formed in a crystal substrate of $LiNbO_3$ having an electro-optic effect. A buffer layer of a dielectric material is formed on the crystal substrate and coplanar waveguide electrodes of a signal electrode and two ground electrodes are formed on the buffer layer. A substrate of a low dielectric constant material formed on the back surface of the crystal substrate and having a slit or concave formed on portions other than end portions of the side to be opposed to the back surface.

16 Claims, 9 Drawing Sheets

TABLE 1

| Dielectric Constant | 3.9 | 2.9 | 1.9 |
|---|---|---|---|
| Buffer Layer | ($SiO_2$)(e.g. $MgF_2$, $BaF_2$, etc) | | |
| Buffer Layer Thickness (μm) | 1.0 | 1.0 | 1.0 |
| Bandwidth × Thickness (GHz·cm) | 100 | 170 | 109 |
| Electrode Thickness (μm) | 12 | 8 | 10 |
| Characteristic Impedance | 43.5 | 51.0 | 48 |

WAVEGUIDE TYPE OPTICAL DEVICE

This is a Continuation of application Ser. No. 08/225,065 filed Apr. 8, 1994, now abandoned.

BACKGROUND OF THE INVENTION

The present invention relates to a waveguide type optical modulator/switch, which is applicable to various systems including those for high-speed optical communication, optical switching networks, optical information processing, optical image processing, etc.

The waveguide type optical modulator is the most important key element for realizing various systems including those for high-speed optical communication, optical switching networks, optical information processing, optical image processing, etc. Hitherto, waveguide type optical modulators have been fabricated with some interesting substrates by various methods of fabrication. Many of these optical waveguide type devices have a $LiNbO_3$ substrate and a GaAs substrate. Internal diffusion of titanium in $LiNbO_3$ provides for a convenient and comparatively simple method of producing low-loss strip waveguides. Important parameters of the waveguide type optical modulator are the driving power, modulation bandwidth and insertion loss. The bandwidth and driving power have a trade-off relation to each other. Research concerning the waveguide type optical modulator, has been centered on the optimization of the trade-off relation noted above.

The bandwidth of the waveguide type optical modulator is mainly dependent on the kind, material and shape of the electrode and the dielectric constant of the substrate. Traveling-wave electrodes are so often used for wide bandwidth applications. The concept of using traveling-wave electrodes is that the traveling-wave electrodes are made extensions of the driving transmission line. Thus, the traveling-wave electrode should have the characteristic impedance of the source and cable. The modulation speed in this case is restricted by the difference between the traveling time (i.e., phase-velocity or effective refractive index) with respect to light and microwave. There are two different traveling-wave electrode structures that can be used, i.e.:

1) an ASL (asymmetric strip line) or ACPS (asymmetric coplanar strip) electrode structure; and 2) a CPW (coplanar waveguide) electrode structure.

In order to increase the bandwidth, the microwave effective refractive index $n_m$ should be reduced (from the value of 4.2) to be close to the light effective refractive index $n_o$ (typically 2.2 in the case of the $LiNbO_3$ substrate).

The bandwidth of the traveling-wave modulator is restricted by the phase-velocity mismatch between microwaves and optical waves. This means that it is necessary to reduce the difference between the microwave and light effective refractive indexes by reducing the microwave effective refractive index. One way of reducing the microwave effective refractive index for increasing the bandwidth is based on the use of a thick electrode and a buffer layer. Modulators using ASL or ACPS electrode structures have already been proposed, as disclosed in a publication "33 GHzo cm Broadband Ti:$LiNbO_3$ Mach-Zehnder Modulator", ECOC' 89, Research Treatise ThB22-5, pp. 443–446 (1989). According to this publication, the microwave effective refractive index is reduced by using a thick electrode layer (ASL or ACPS electrode structure) and a buffer layer. A problem in the ASL or ACPS electrode structure is that the bandwidth is restricted to around 12 GHz by microwave resonation due to chip cross section. In order to increase the bandwidth to above 12 GHz, the chip dimensions (both width and thickness) should be reduced to about 0.6 mm. The requirement that the thickness of the chip should be about 0.6 mm poses no significant problem. However, the requirement that the width of the chip should be about 0.6 mm, poses problems when the chip is held, mounted and packaged.

Another way of reducing the microwave effective refractive index is to use an air layer which is formed by using a metal shield in a conventional traveling-wave electrode structure. This is introduced in a research treatise "New Traveling-Wave Electrode Mach-Zehnder Optical Modulator with 20 GHz Bandwidth of and 4.7 V Driving Voltage at 1.52 μm Wavelength", Electronics Letters, Vol. 25, No. 20, pp. 1,382–1,383 (1989). This structure has a problem that a special metal cover shielded plate having Grooves has to be produced with accurate dimensions. This requires special and difficult techniques, increases the steps of fabrication and reduces allowable manufacturing tolerances.

Besides, even if the phase-velocity mismatch between microwaves and optical waves can be alleviated by one of the above ways, there is a restriction imposed on the bandwidth of the modulator/switch by the microwave attenuation caused by the electrode structure. For example, even if perfect phase-velocity matching is obtained between microwaves and optical waves, the ultimate bandwidth of the device is small unless the microwave attenuation is reduced. Generally, the microwave attenuation in devices is caused by:

a) conductor loss (which is a function of the electrode material and parameters thereof);

b) dielectric loss (which is a function of substrate characteristics);

c) loss due to impedance mismatching with respect to 50 Ω source and load;

d) loss due to higher order mode propagation (which is further increased where there are CPW electrodes); and e) connector loss.

A novel structure for high-speed optical modulators is thus necessary, which has a characteristic impedance of about 50 Ω, substantially perfect phase-velocity matching between microwaves and optical waves, small microwave attenuation, and further which readily permits a simple process of fabrication as an extension of the general process of electrode fabrication and not requiring any extra special shield.

Hitherto, there has been no wide bandwidth, low voltage Ti:$LiNbO_3$ optical modulator using thick but conventional CPW electrodes. The inventor has realized such a wide bandwidth optical modulator using a thick but conventional CPW electrode structure, which solves some of the problems discussed above. This wide bandwidth optical modulator is introduced in a research treatise "A Wide-Band Ti:$LiNbO_3$ Optical Modulator With A Conventional Coplanar Waveguide Type Electrodes", IEEE Photonics. Tech. Lett. Vol. 4, No. 9, pp. 1,020–1,022, 1992 (hereinafter referred to as a prior art example). According to this research treatise, by appropriately selecting the material and thickness of the buffer layer and those of the electrode, the microwave effective refractive index $n_m$ is reduced (from a value of 4.2) to be close to the light effective refractive index $n_o$ (typically 2.2 in case of the $LiNbO_3$ substrate). Further, the inventor has reduced the microwave attenuation in the structure by alleviating loss due to higher order mode microwave propagation. This could be attained by reducing the thickness of the chip from 0.8 mm to about 0.1 mm. Consequently, a wide-band optical modulator could be realized.

Some of problems which remain without being solved in the above prior art example, are as follows:

1) The thickness of the chip is as very small as the order of 0.1 mm. Therefore, holding, packaging and connection of fiber/fiber connector at end portions are difficult. This means that the total thickness of device at end portions thereof should be increased without increasing the thickness at the other portions of the device.

2) The characteristic impedance is 43.5 Ω, which is smaller than the optimum required value of 50 Ω for low-loss matching. Therefore, the microwave reflection in the device is increased to increase the total microwave loss in the device so as to reduce the attainable bandwidth. This means that it is necessary to obtain a structure having a characteristic impedance of 50 Ω.

3) It is required to further reduce the conductor loss in the CPW electrode, thereby alleviating the microwave attenuation in the device for obtaining a high-speed (wide-band) optical modulator/switch.

SUMMARY OF THE INVENTION

An object of the present invention is therefore to provide a waveguide type optical device capable of holding, packaging and connection of a fiber/fiber connector at end portions.

Another object of the present invention is therefore to provide a waveguide type optical device having a characteristic impedance of 50 Ω.

Yet another object of the present invention is therefore to provide a waveguide type optical device capable of reducing the conductor loss in the CPW electrode for obtaining a high-speed (wide-band) optical modulator/switch.

According to one aspect of the present invention, an air gap is provided between a chip and a low dielectric constant substrate except for end portions of the two, and a low dielectric constant substrate having a slit (or a concave structure) is used. In this way, a part of the total microwave attenuation in the device could be reduced. It is thus possible to realize a high-speed modulator, which has a thick CPW traveling-waveguide electrode (i.e., asymmetric traveling-waveguide electrode) structure subject to reduced microwave attenuation.

Further, according to another aspect of the present invention the microwave effective refractive index is reduced by providing a thick electrode structure and a thick buffer layer. The characteristic impedance of 50 Ω could be attained by appropriately selecting the buffer material. It is thus possible to realize a high-speed optical modulator using a thick but conventional CPW electrode structure, which can be fabricated by a simple and comparatively easy process and has a characteristic impedance of 50 Ω.

According to yet another aspect of the present invention, by forming a special electrode structure the overall volume of the signal electrode is increased to reduce the resistance and also reduce the total microwave attenuation so as to increase the bandwidth. Control of the microwave effective refractive index is obtainable through control of the thickness, width and gap of the special electrode structure. The microwave effective refractive index thus reaches the value of the light effective refractive index. Thus, the bandwidth can be increased to permit realization of a high-speed and low-driving voltage optical modulator. Further, it is possible to provide a method of fabrication for obtaining special electrodes.

Other objects and features of the present invention will be clarified from the following description with reference to the attached drawings.

Table 1 shows values of the bandwidth and characteristic impedance for the different dielectric constants.

Figure 6A:
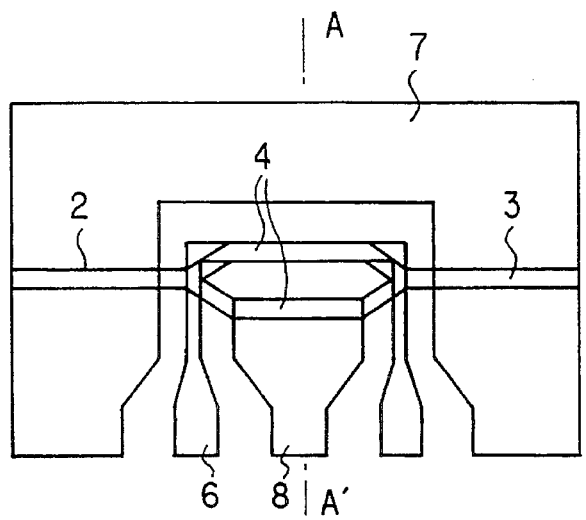

FIGS. 6A to 6D show the structure of a basic device (optical modulator/switch) of a third embodiment of the present invention; and FIGS. 7A to 7J show the procedure of fabrication of the example of the additional electrode structure shown in FIG. 6A.

DETAILED DESCRIPTION OF THE PREFERRED EMBODIMENTS

Figure 1A:
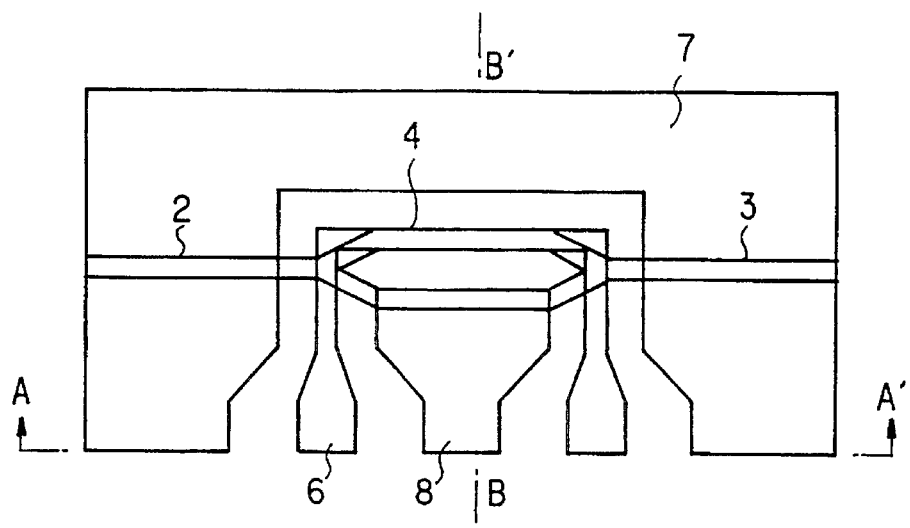
FIGS. 1A to 1C show the structure of a basic device (optical modulator/switch) of a first embodiment of the present invention.
Figure 1B:
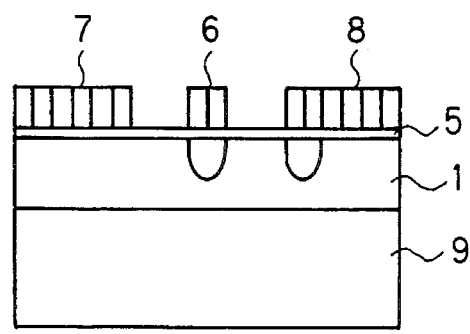
Figure 1C:
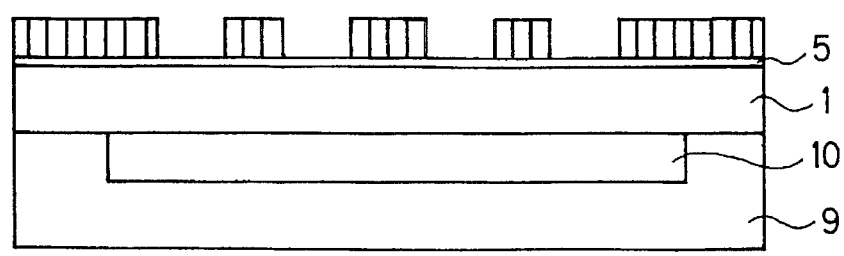

FIGS. 1A to 1C show the structure of a basic device (optical modulator/switch) as an embodiment of the present invention, FIG. 1A being a plan view, FIG. 1B being a cross-sectional view taken along plane B–B' in FIG. 1A, FIG. 1C being a cross-sectional view taken in direction A–A' in FIG. 1A.

A crystal substrate (for instance, LiNbO$_3$ crystal wafer) 1 having an electro-optic effect, is formed with waveguides 2, 3 and 4 of a width of 5 to 12 μm and a depth of 3 to 10 μm by depositing a titanium metal film with a width of 5 to 12 μm and diffusing the titanium in the crystal substrate at 900° to 1,100° C. for 5 to 12 hours. The waveguide thus formed consists of two Y branch waveguides (one serving as a distributor in an input section 2 and the other serving as a synthesizer in an output section 3) and a phase shifter 4. A buffer layer (i.e., a dielectric layer having a dielectric constant of 1.2 or more, that is preferably 1.1 to 40) 5 is formed to cover the waveguides for reducing the TM mode loss. Electrodes for characteristic impedance control are formed over the waveguides. The buffer layer 5 has a thickness of 0.3 to 10 μm. On the buffer layer, a coplanar waveguide electrode structure is formed, which comprises a signal electrode 6 having a width of 5 to 30 μm and a length of 10 to 70 mm and two grounding electrodes 7 and 8 having a width of 100 to 8,000 μm and a length of 10 to 70 mm. Subsequently, the chip is mounted on a low dielectric constant glass substrate 9. The glass substrate 9, as shown in FIG. 1C, is provided with a slit (or a concave structure) to form an air gap 10 between the chip and glass substrate 9 other than edge portions thereof.

The material and thickness of the buffer layer 5 and also the material and thickness of the electrodes 6, 7 and 8, are appropriately structured to reduce the microwave effective refractive index $n_m$ (from a value of 4.2) to be close to the light effective refractive index $n_o$ (which is typically 2.2 with a LiNbO$_3$ substrate). The microwave attenuation of the substrate 1 is alleviated by reducing the microwave loss in higher order mode propagation. This can be attained by reducing the thickness of the chip from 0.8 mm to about 0.1 mm.

According to a first embodiment of the present invention, the chip thickness is held to be about 0.1 mm in the periphery of the CPW electrode structure. In chip end portions, however, the thickness of the entire device inclusive of the thickness of the substrate 1 is increased to 0.5 to 5.0 mm. This facilitates holding, mounting and packaging, thus permitting comparatively ready connection of a fiber/fiber connector.

Now, a second embodiment of the present invention will be described.

Figure 2A:
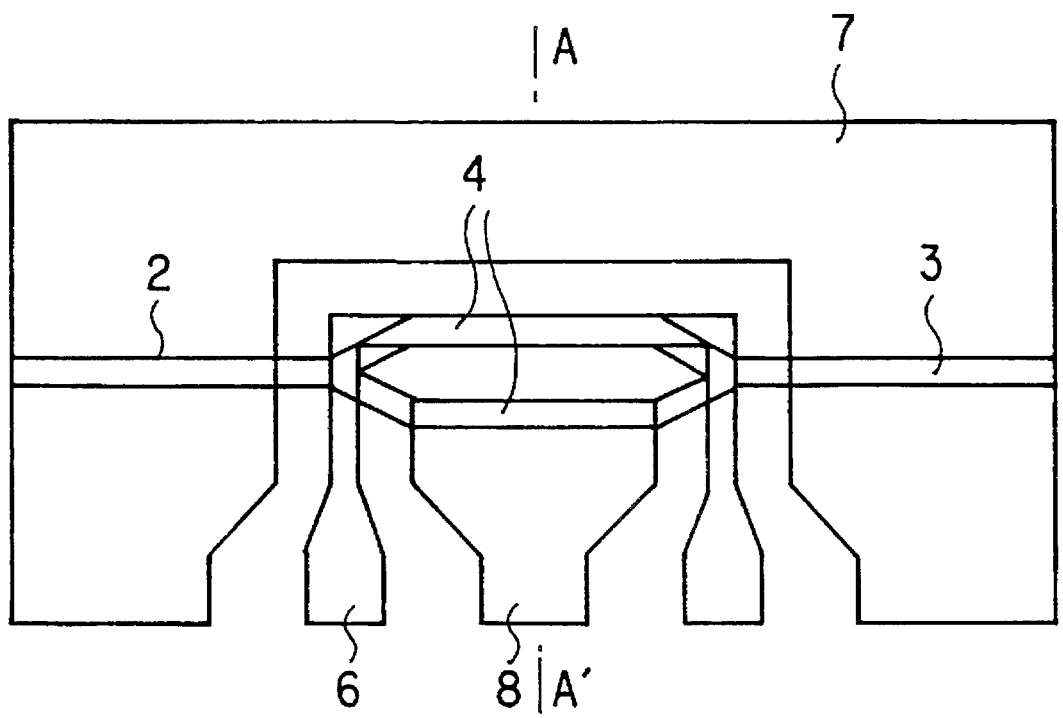
FIGS. 2A and 2B show the structure of a basic device (optical modulator/switch) of a second embodiment of the present invention.
Figure 2B:
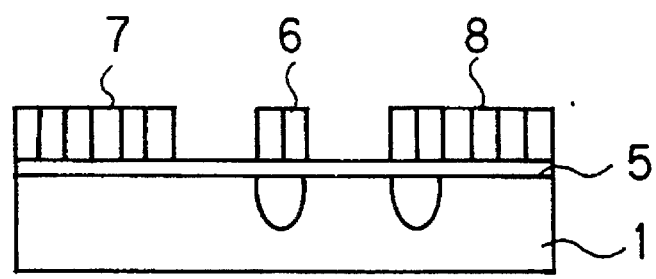

FIGS. 2A and 2B show the structure of a basic device (optical modulator/switch) embodying the present invention, FIG. 2A being a plan view, FIG. 2B being a cross-sectional view taken along plane A–A'.

A crystal substrate (for instance, a LiNbO$_3$ crystal wafer) 1 having an electro-optic effect, is provided with waveguides 2, 3 and 4 having a width of 5 to 12 μm and a depth of 3 to 10 μm by depositing a titanium metal film having a width of 5 to 12 μm and diffusing the titanium at 900° to 1,100° C. for 5 to 12 hours. The waveguide consists of two Y branch waveguide (one serving as a distributor in an input section 2 and the other serving as a synthesizer in an output section 3) and a phase shifter 4. A buffer layer (i.e., a dielectric layer having a dielectric constant of 1.2 or more) 5 is formed to cover the waveguides for reducing the TM mode loss. Electrodes for characteristic impedance control are formed over the waveguides. The buffer layer 5 has a thickness of 0.3 to 10 μm. On the buffer layer, a coplanar waveguide electrode structure is formed, which comprises a signal electrode 6 having a width of 5 to 30 μm and a length of 10 to 70 mm and two grounding electrodes 7 and 8 having a width of 100 to 8,000 μm and a length of 10 to 70 mm.

Figure 3A:
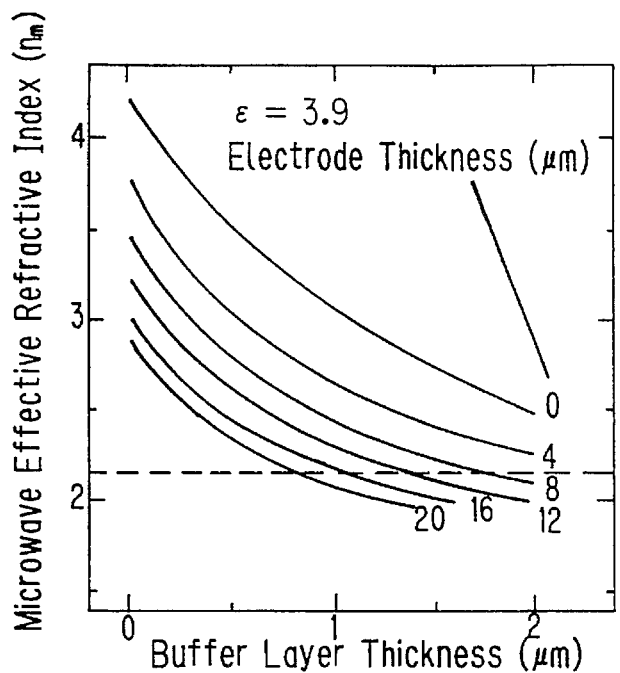
FIGS. 3A to 3C show calculated values of the microwave effective refractive index $n_m$ as a function of the dielectric constant and buffer layer thickness.
Figure 3B:
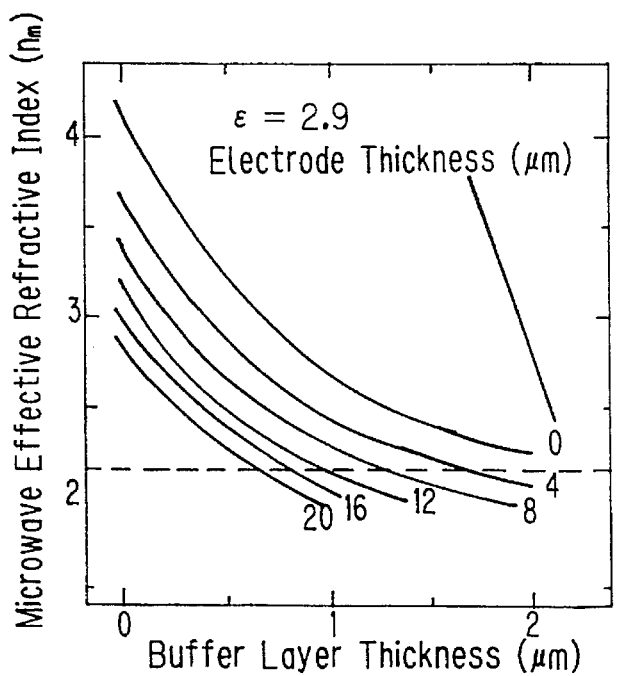
Figure 3C:
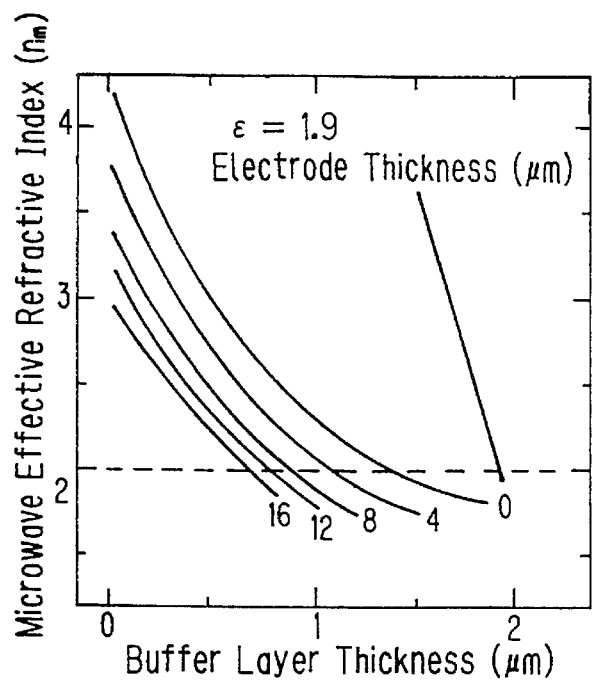

This structure was analyzed using an over relaxation method to calculate the capacitance, microwave effective refractive index, characteristic impedance, bandwidth, etc. FIGS. 3A to 3C show refractive index $n_m$ as a function of the dielectric calculated values of the microwave effective constant and buffer layer thickness. In these graphs, the ordinate is taken for the microwave effective refractive index nm, and the abscissa for the dielectric layer thickness in μm. FIGS. 3A to 3C show cases where the dielectric constant is 3.9, 2.9 and 1.9, respectively.

Figure 4A:
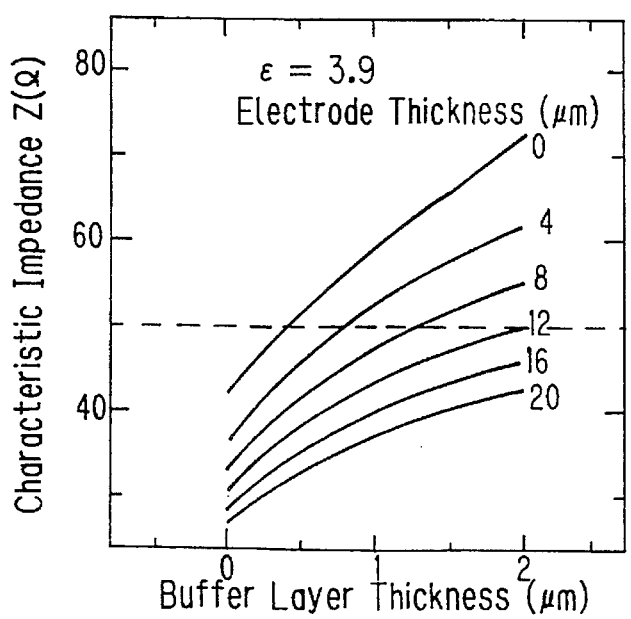
FIGS. 4A to 4C show calculated values of the characteristic impedance as a function of the dielectric constant and buffer layer thickness.
Figure 4B:
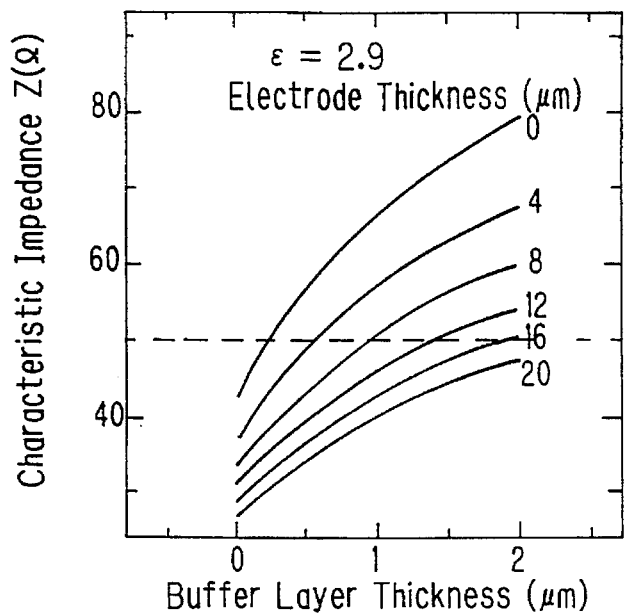
Figure 4C:
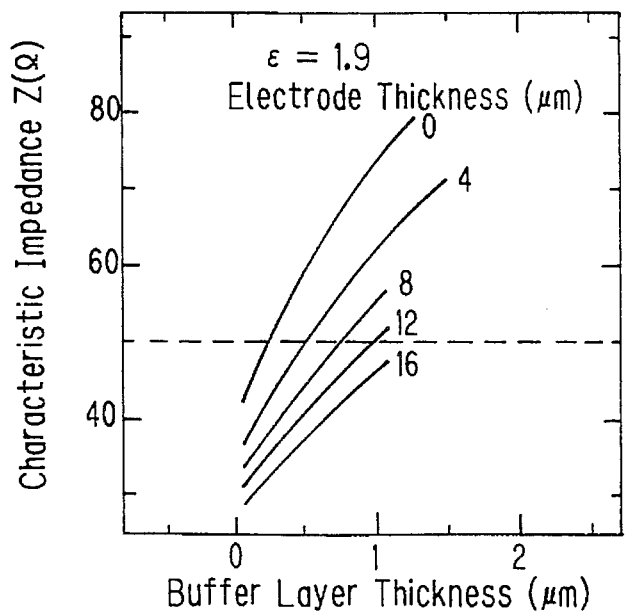

FIGS. 4A to 4C show calculated values of the characteristic impedance as a function of the dielectric constant and buffer layer thickness. In these graphs, the ordinate is taken for the characteristic impedance in Ω, and the abscissa for the buffer layer thickness in μm. FIGS. 4A to 4C show cases where the dielectric constant is 3.9, 2.9 and 1.9, respectively.

Figure 5A:
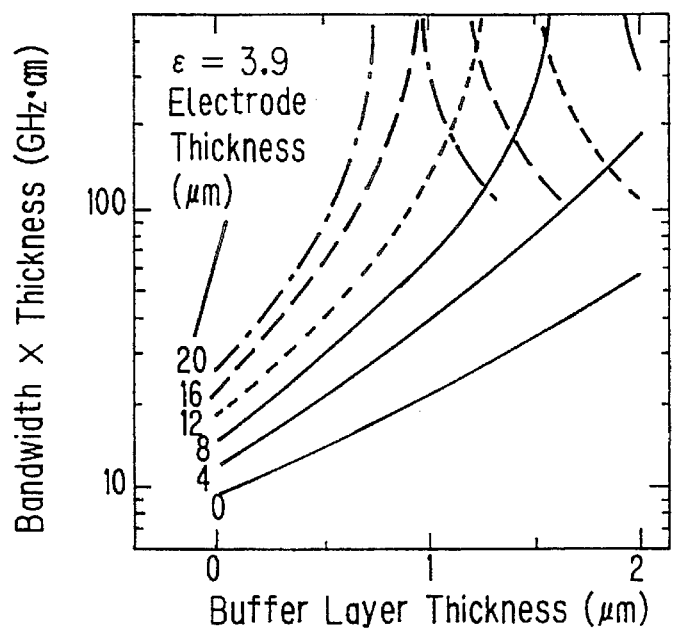
FIGS. 5A to 5C show calculated values of the product of the optical bandwidth and length as a function of the dielectric constant and buffer layer thickness.
Figure 5B:
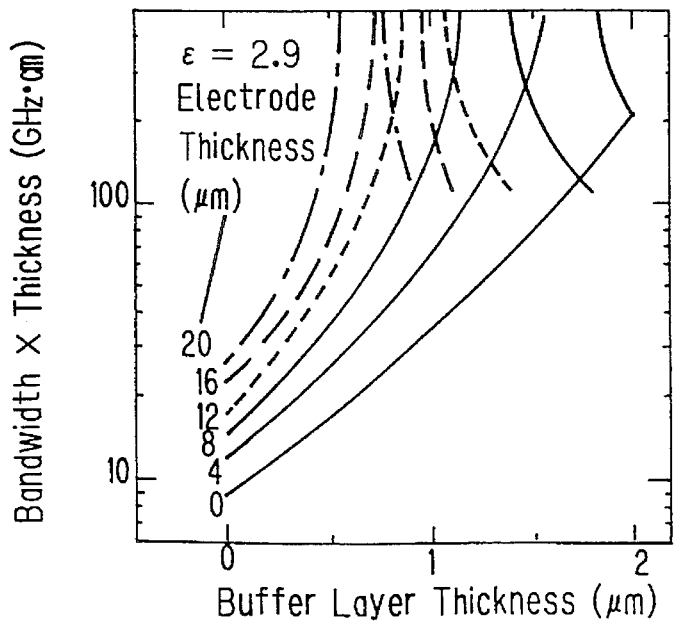
Figure 5C:
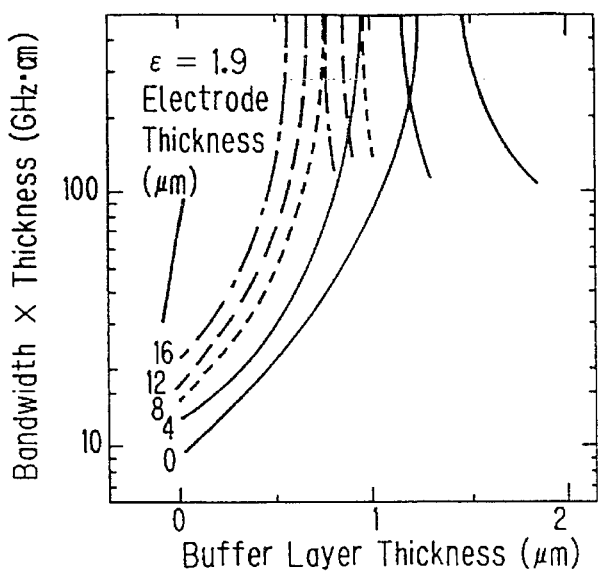

FIGS. 5A to 5C show calculated values of the product of the optical bandwidth and length as a function of the dielectric constant and buffer layer thickness. In these graphs, the ordinate is taken for the product of bandwidth and length in GHz.cm, and the abscissa for the dielectric layer thickness in μm. FIGS. 5A to 5C show cases where the dielectric constant is 3.9, 2.9 and 1.9, respectively.

Table 1 shows a summary of important results. In Table 1, values of the bandwidth and characteristic impedance for the different dielectric constants are shown. It will be seen that a wide bandwidth optical modulator having a characteristic impedance of about 50 Ω is attainable by using dielectric layers having these dielectric constants.

Now, a third embodiment of the present invention will be described.

Figure 6B:
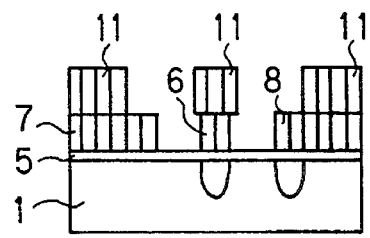
Figure 6C:
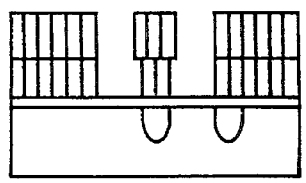
Figure 6D:
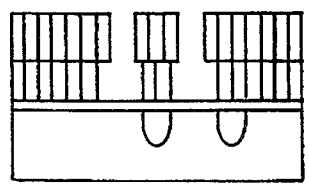

FIGS. 6A to 6D show the structure of a basic device (optical modulator/switch) embodying the present invention, FIG. 6A being a plan view, FIGS. 6B to 6D being cross-sectional views taken along plane A–A' showing different shapes.

A crystal substrate (for instance, LiNbO$_3$ crystal wafer) 1 having an electro-optic effect is provided with waveguides 2, 3 and 4 having a width of 5 to 12 μm and a depth of 3 to 10 μm by depositing a titanium metal film having a width of 5 to 12 μm and diffusing the titanium in the crystal substrate at 900° to 1,100° C. for 5 to 12 hours. The waveguide consists of two Y branch waveguides (one serving as a distributor in an input section 2 and the other serving as a synthesizer in an output section 3) and a phase shifter 4. A buffer layer (i.e., a dielectric layer having a dielectric constant of 1.2 or more) 5 is formed to cover the waveguides for reducing the TM mode loss. Electrodes for characteristic impedance control are formed over the waveguides. The buffer layer 5 has a thickness of 0.3 to 10 μm. On the buffer layer, a coplanar waveguide electrode structure is formed, which comprises a signal electrode 6 having a width of 5 to 30 μm and a length of 10 to 70 mm and two grounding electrodes having a width of 100 to 8,000 μm and a length of 10 to 70 mm. Subsequently, an additional set 11 of signal electrode 6 and grounding electrodes 7 and 8 is formed (the signal electrode having a width of 5 to 30 μm and a length of 10 to 70 mm, the two grounding electrodes having a width of 100 to 8,000 μm and a length of 10 to 70 mm).

With the additional electrode structure thus formed, the overall volume of the signal electrode is increased to reduce the resistance, and hence reduce the total microwave attenuation, thus increasing the bandwidth. It is possible that through control of the thickness, width and gap of the additional electrode structure, the microwave effective refractive index is controlled to bring the microwave effective refractive index to be close to the light effective refractive index. Doing so further has an effect of increasing the bandwidth. It is thus possible to realize a high-speed, low-driving voltage optical modulator.

Now, a method of fabrication of the embodiment will be described.

The crystal wafer 1 is provided with the waveguides 2, 3 and 4 by depositing a titanium metal film and causing diffusion thereof into the crystal. Then, the buffer layer 5 is formed. On the buffer layer, a coplanar (or asymmetric) traveling-waveguide electrode structure is formed. This is made by covering the buffer layer with a photo-resist, patterning the photo-resist and electroplating gold (Au).

The additional electrode structure may be formed by two methods.

In a first method, the previous resist-Au structure is covered with a different kind of photo-resist (not reacting with the previous photo-resist), which is then patterned, and then electro-plating is provided, thus obtaining the additional electrode structure.

In a second method, the previous photo-resist is reformed (by a heat treatment, a chemical reaction, etc.), and then it is covered with the same kind of photo-resist as the previous photo-resist such as not to cause reaction with the previous photo-resist, followed by patterning and electro-plating.

FIGS. 6B, 6C and 6D show different examples for the grounding electrodes of the additional electrode shapes. In the example shown in FIG. 6B, the grounding electrodes have a shorter length than the length of the under grounding electrodes 7 and 8. In the example shown in FIG. 6C, the grounding electrodes have the same length as the length of the under grounding electrodes 7 and 8. In the example shown in FIG. 6D, the grounding electrodes have a longer length than the length of the under grounding electrodes 7 and 8.

Figure 7A:
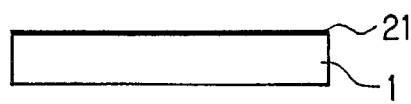
Figure 7B:
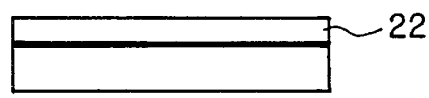
Figure 7C:
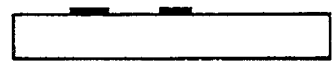
Figure 7D:
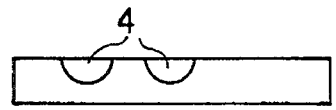
Figure 7E:
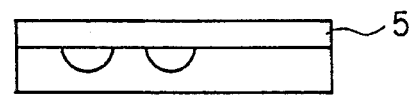
Figure 7F:
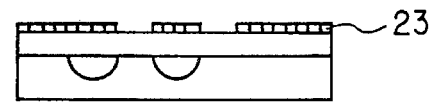
Figure 7G:
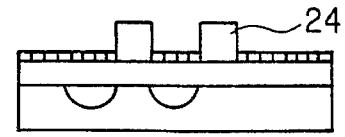
Figure 7H:
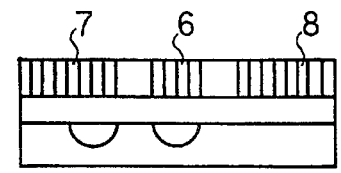
Figure 7I:
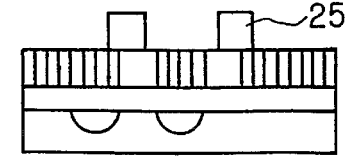
Figure 7J:
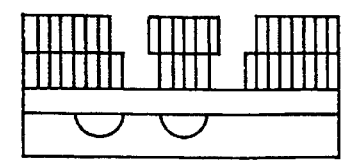

FIGS. 7A to 7J show the procedure of fabrication of the example of the additional electrode structure shown in FIG. 6A. First, as shown in FIG. 7A, a titanium metal film 21 is deposited on the crystal 1. Then, as shown in FIG. 7B, the titanium metal film 21 is covered with a photo-resist 22. As shown in FIG. 7C, the photo-resist is patterned by exposure to UV light, followed by development and removal of photo-resist. Subsequently, as shown in FIG. 7D, the titanium metal film 21 is thermally diffused into the crystal 1, thus forming the waveguides 2, 3 and 4. As shown in FIG. 7E, the buffer layer 5 is formed to cover the wafer. Then, as shown in FIG. 7F, an under electrode layer 23 (before electro-plating) is formed on the buffer layer 5. Next, as shown in FIG. 7G, the wafer is covered with photo-resist, which is then exposed to UV light, followed by development, thus leaving photo-resist 24 in areas without the under electrode layer 23. Then, as shown in FIG. 7H, the signal electrode 6 and grounding electrodes 7 and 8 are formed by electro-plating the under electrode layer 23. Next, as shown in FIG. 7I, the wafer is covered with photo-resist, which is exposed to UV light, followed by development, thus forming a pattern of photo-resist 25. Finally, as shown in FIG. 7J, the additional electrode structure is formed by electro-plating, followed by removal of the photo-resists 24 and 25.

It will be obvious that the structures shown in FIGS. 6C and 6D are obtainable by similar methods to the above method of fabrication.

As has been shown, according to the present invention, it becomes possible to obtain a high-speed optical modulator/switch, which permits ready holding, packaging and connection of a fiber/fiber connector at end portions, has a characteristic impedance of 50 Ω and is subject to alleviated microwave attenuation.

What is claimed is:

1. A waveguide type optical device comprising:

a crystal substrate having an electro-optical effect;

a waveguide formed in said crystal substrate;

a buffer layer provided on said crystal substrate and having a dielectric having a dielectric constant of 1.1 to 40;

at least one pair of electrodes provided on said buffer layer;

a substrate provided on the back surface of said crystal substrate, said substrate consisting of a dielectric having a low dielectric constant and having a slit or a concave structure; and an air gap being formed between said crystal substrate and said low dielectric constant dielectric substrate except for end portions of said substrates.

2. A waveguide type optical device comprising:

a crystal substrate having an electro-optical effect;

a waveguide formed in said crystal substrate;

a buffer layer provided on said crystal substrate and having a dielectric having a dielectric constant of 1.1 to 40;

at least one pair of electrodes provided on said buffer layer; and a substrate provided on a back surface of said crystal substrate, wherein said substrate comprises a dielectric having a low dielectric constant and having one of a slit or a concave structure.

3. A device according to claim 2, wherein an air gap is formed between said crystal substrate and said low dielectric constant dielectric substrate except for end portions of said crystal substrate and said low dielectric constant dielectric substrate.

4. A device according to claim 2, further comprising a third electrode mounted on said buffer layer between electrodes of said at least one pair of electrodes.

5. A device according to claim 4, wherein characteristics of said buffer layer and characteristics of said at least one pair of electrodes are selectively chosen according to desired device characteristics, said device characteristics including characteristic impedance.

6. A device according to claim 2, wherein characteristics of said buffer layer and characteristics of said at least one pair of electrodes are selectively chosen according to desired device characteristics, said device characteristics including characteristic impedance.

7. A waveguide type optical device comprising:

a crystal substrate having an electro-optical effect;

a waveguide formed in said crystal substrate;

a buffer layer provided on said crystal substrate and having a dielectric constant of 1.1 to 40;

at least one pair of electrodes on said buffer layer; and an additional pair of electrodes provided directly on said pair of electrodes, at least one width of the additional pair of electrodes extending over the one of said pair of electrodes in a cantilevered fashion.

8. A device according to claim 7, further comprising a substrate provided on a back surface of said crystal substrate.

9. A device according to claim 7, further comprising a third electrode mounted on said buffer layer between electrodes of said at least one pair of electrodes.

10. A device according to claim 9, wherein characteristics of said buffer layer and characteristics of said at least one pair of electrodes are selectively chosen according to desired device characteristics, said device characteristics including characteristic impedance.

11. A device according to claim 7, wherein characteristics of said buffer layer and characteristics of said at least one pair of electrodes are selectively chosen according to desired device characteristics, said device characteristics including characteristic impedance.

12. A waveguide type optical device comprising:

a crystal substrate of $LiNbO_3$ having an electro-optical effect;

waveguides of titanium metal formed in said crystal substrate;

a buffer layer of a dielectric material formed on said crystal substrate;

coplanar waveguide electrodes of a signal electrode and two ground electrodes formed on said buffer layer; and a substrate of a low dielectric constant material formed on the back surface of said crystal substrate and having a slit or concave structure formed on portions other than end portions of the side to be opposed to said back surface.

13. A waveguide type optical device as set forth in claim 12, said waveguides comprising two Y branch waveguides, one of which serves as a distributor in an input section and another of which serves as a synthesizer in an output section, and a phase shifter.

14. A waveguide type optical device as set forth in claim 12, said dielectric constant of said buffer layer being 1.1 to 40.

15. A waveguide type optical device comprising:
- a crystal substrate having an electro-optical effect;
- a waveguide formed in said crystal substrate;
- a buffer layer provided on said crystal substrate and having a dielectric having a dielectric constant of 1.1 to 40;
- at least one pair of electrodes provided on said buffer layer;
- an additional pair of electrodes provided on said pair of electrodes; and
- a substrate provided on a back surface of said crystal substrate;
- wherein said substrate comprises a dielectric having a low dielectric constant and having one of a slit or a concave structure.

16. A device according to claim 15, wherein an air gap is formed between said crystal substrate and said low dielectric constant dielectric substrate except for end portions of said crystal substrate and said low dielectric constant dielectric substrate.

* * * * *